(12) United States Patent
Bollella

(10) Patent No.: US 6,466,962 B2
(45) Date of Patent: *Oct. 15, 2002

(54) SYSTEM AND METHOD FOR SUPPORTING REAL-TIME COMPUTING WITHIN GENERAL PURPOSE OPERATING SYSTEMS

(75) Inventor: Gregory Bollella, Carrboro, NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 08/472,365

(22) Filed: Jun. 7, 1995

(65) Prior Publication Data

US 2001/0054055 A1 Dec. 20, 2001

(51) Int. Cl.[7] .................................................. G06F 9/00
(52) U.S. Cl. ...................................... 709/107; 709/104
(58) Field of Search ................................ 395/800, 650, 395/500, 670; 370/58.2; 709/226, 102, 104, 107, 108

(56) References Cited

U.S. PATENT DOCUMENTS

| | | |
|---|---|---|
| 4,575,816 A | 3/1986 | Hendrickson et al. |
| 4,796,179 A | 1/1989 | Lehman et al. |
| 4,993,017 A * | 2/1991 | Bachinger et al. ......... 370/58.2 |
| 5,101,491 A | 3/1992 | Katzeff |
| 5,291,614 A | 3/1994 | Baker et al. |
| 5,295,264 A * | 3/1994 | Werres et al. ............... 395/650 |
| 5,347,649 A | 9/1994 | Alderson |
| 5,363,497 A | 11/1994 | Baker et al. |
| 5,371,879 A | 12/1994 | Schiffleger |
| 5,438,844 A * | 8/1995 | Hoglund et al. ............... 62/155 |
| 5,506,988 A * | 4/1996 | Weber et al. ................ 395/673 |
| 5,535,380 A * | 7/1996 | Bergkuist, Jr. et al. ..... 395/550 |

* cited by examiner

Primary Examiner—John A. Follansbee
(74) Attorney, Agent, or Firm—Jeanine S. Ray-Yarletts; Bracewell & Patterson, L.L.P.

(57) ABSTRACT

A method of supporting real-time computing within a general purpose operating system, by supporting co-resident operating systems. This is a methodology for allowing existing, well-understood real-time systems technology to co-exist with commercial, general purpose operating systems to support applications such as desktop multimedia conferencing. The approach is to partition the central processor and other system resources into two virtual machines, first a machine running a largely unmodified general purpose operating system, and second a machine running a real-time kernel, then to multiplex access to the physical hardware by the virtual machines.

10 Claims, 6 Drawing Sheets

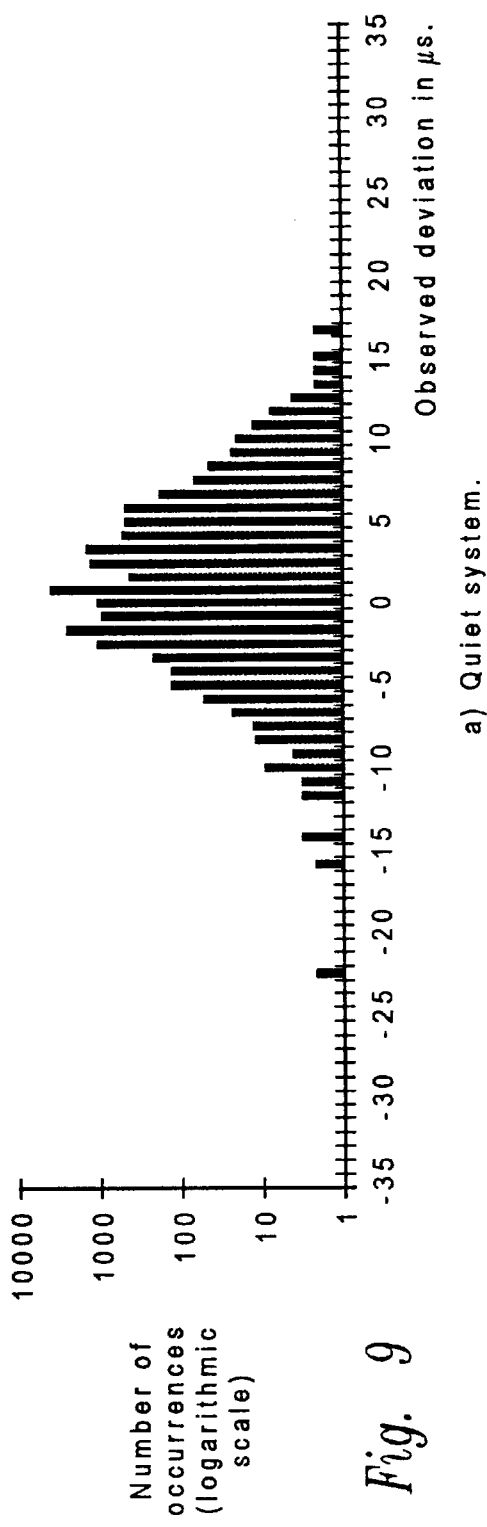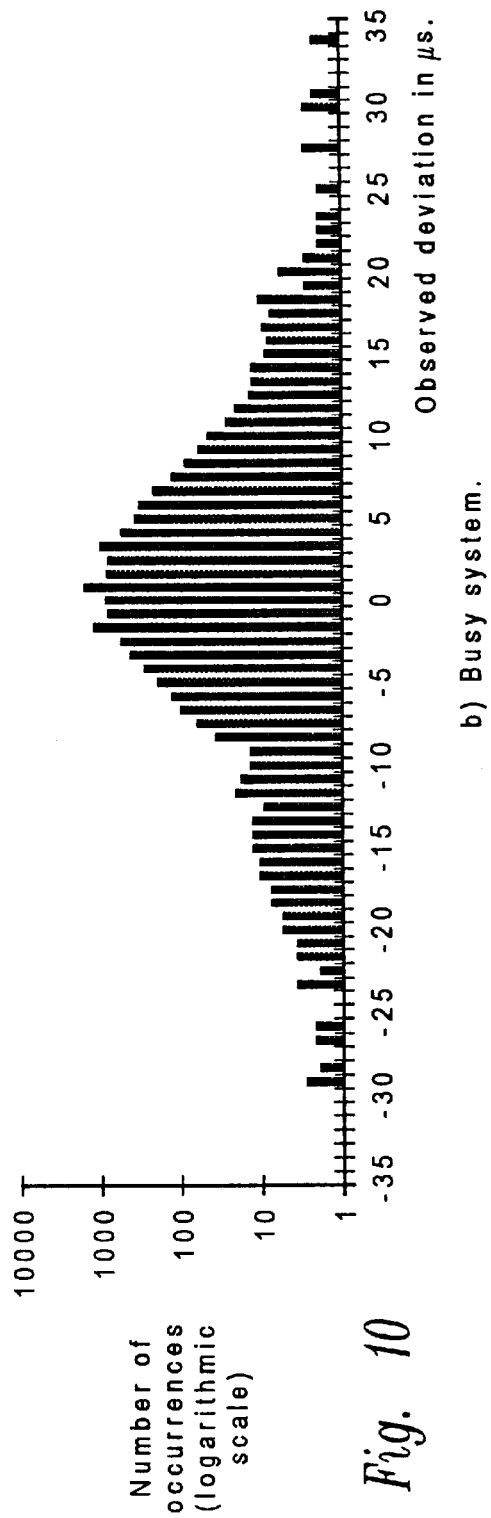

Execution times in seconds for an IBM Microkernel build.

| Experiment | Elapsed Time |
|---|---|
| 1. Unmodified IBM Microkernel | 180 |
| 2. CPU executive present but not running | 184 |
| 3. CPU executive running, RTK idle | 201 |
| 4. CPU executive running, 2 RTK tasks | 216 |

*Fig. 11*

Measured overhead in % of all processor cycles consumed.

| System Component | % |
|---|---|
| Interrupt disabling emulation | 2.17 |
| RTC Interrupt processing | 8.46 |
| Real-time task execution | 6.94 |
| Total of all non-GPOS code | 16.67 |

*Fig. 12*

SYSTEM AND METHOD FOR SUPPORTING REAL-TIME COMPUTING WITHIN GENERAL PURPOSE OPERATING SYSTEMS

BACKGROUND OF THE INVENTION

1. Technical Field

The present invention relates to data processing systems, and, more particularly, the invention relates to a system and method of improving co-resident operating systems.

2. Description of the Related Art

Recent advances in high-speed networks, workstation processors, and digital audio and video acquisition/compression/display hardware have led to tremendous interest in the problems of supporting the real-time computation and communication requirements of distributed multimedia applications; examples of descriptions of this interest are given in the following:

(1) *Processor Capacity Reserves: Operating System Support for Multimedia Applications*, Mercer, C. W., Savage, S., Tokuda, H., IEEE Intl. Conf. on Multimedia Computing and Systems, Boston, Mass., May 1994, pp. 90–99.

(2) *Adaptive Real-Time Resource Management Supporting Modular Composition of Digital Multimedia Services*, M. B. Jones, in Network and Operating System Support for Digital Audio and Video, Proceedings, Fourth Intl. Workshop, Lancaster UK, November 1993, D. Shepherd, et al. (Eds.). Lecture Notes in Computer Science, Vol. 846, pp. 21–28, Springer-Verlag, Heidelberg, 1994.

(3) *Dynamic QOS Control Based on Real-Time Threads*, H.

Tokuda, T. Kitayama, in Network and Operating System Support for Digital Audio and Video, Proceedings, Fourth Intl,. Workshop, Lancaster, UK, November 1993. D. Shepherd, et al. (Eds.). Lecture Notes in Computer Science, Vol. 846, pp. 124–137, Springer-Verlag, Heidelberg, 1994.

(4) *Workstation Support for Time-Critical Applications*, J. G.

Hanko, E. M. Kuerner, J. D. Northcutt, G. A. Wall, in Network and Operating System Support for Digital Audio and Video, Proceedings, Second Intl. Workshop, Heidelberg, Germany, November 1992, R. G. Herrtwich (Ed.). Lecture Notes in Computer Science, Vol. 614, pp. 4–9, Springer-Verlag, Heidelbert, 1992.

(5) *Scheduling and IPC Mechanisms for Continuous Media*, Govindan, R., Anderson, D. P., Proc. ACM Symp. on Operating Systems Principles, ACM Operating Systems Review, Vol. 25, No. 5, October 1991, pp. 68–80.

(6) *Kernel Support for Live Digital Audio and Video*, K. Jeffay, D. L. Stone, F. D. Smith, Computer Communications, Vol. 15, No. 6. (July/August 1992) pp. 388–395.

(7) *Support for Continuous Media in the DASH System*, Anderson, D. P., Tzou, S. -Y., Wahbe, R., Govindan, R., Andrews, M., Proc,. Tenth Intl. Conf. on Distributed Computing Systems, Paris, France, May 1990, pp. 54–61.

However, although much research has been performed on the design of real-time operating systems, and much is on-going in the distributed multimedia domain, the vast majority of computers in use today use operating systems that provide no support for real-time computing beyond allowing tasks to manipulate their execution priority. Operating systems that (a) allow programs to specify their real-time performance requirements and (b) guarantee these requirements are met, have been, and are still, largely confined to academic and industrial research laboratories.

Previously, there have been two identifiable approaches to marrying real-time and non-real-time technologies.

First, there have been several attempts to add real-time features such as periodic tasks and priority-inversion-free interprocess communication mechanisms into existing general purpose operating systems such as Unix and Mach. These have been described in items (1), (3), and (4) above.

The second approach is to design a general purpose but dynamically configurable operating system kernel that is capable of accommodating user or application specific process, scheduling and memory management modules. This second approach has been described in *SPIN—An Extensible Microkernel for Application-Specific Operating System Services*, Bershad, B. N., Chambers, C., Egers, S., Maeda, C., McNamee, D., Pardyak, P.,Savage, S., Sirer, E. G., Op. Sys. Review, Vol. 29, No. 1, (January 1995), pp. 74–77.

Other related works include the design of IBM's VM operating system as described in VM/370 *Asymmetric Multiprocessing*, Holley, L. H., Parmelee, R. P., Salisbury, C. A, Saul, D. N., IBM Systems Journal, Vol. 18, No. 1, (1979), pp. 47–70, and the general time-division multiplexing technique used in bus and communication protocols. Other attempts to directly embed real-time systems technology into general purpose operating systems include the HeiTS network communication system as described in *Implementing HeiTS: Architecture and Implementation Strategy of the Heidelberg High-Speed Transport System*, Hehmann D., Herrtwich, R. G., Schulz, W., Schutt, T., Steinmetz, R., Proc. Second Intl. Workshop on Network and Operating System Support for Digital Audio and Video, Springer-Verlag, LNCS, Vol, 614, 1992. In HeiTS, a real-time kernel is embedded into a network device driver and used to maintain real-time communication of multimedia data across a network.

SUMMARY OF THE INVENTION

It is an object of the present invention to provide improved support for real-time computing within general purpose operating systems.

It is another object of the invention to provide a system and method of supporting co-resident operating systems in a data processing system.

These and other objects of the invention are achieved as is now described. A method of supporting real-time computing within a general purpose operating system, according to the present invention, is described according to a third approach, differing from the two approaches above. This third approach is that of supporting co-resident operating systems. The interest here lies in developing a methodology for allowing existing, well-understood real-time systems technology to co-exist with commercial, general purpose operating systems to support applications such as desktop multimedia conferencing. Thus, the emphasis here is not so much on the development of raw real-time systems technology per se, but rather on developing a vehicle for the incorporation and use of existing technology in conventional desktop operating systems.

In this invention, the approach is to partition the central processor and other system resources into two virtual machines, first a machine running a largely unmodified general purpose operating system, and second a machine running a real-time kernel, then to multiplex access to the physical hardware by the virtual machines. By allowing the co-existence of two operating systems, this approach allows a clean separation of concerns between the requirements and desired solutions for non-real-time, general purpose computing services and those for real-time services. Thus, the computer programmer or system designer should be able to "mix-and-match" general purpose operating systems and real-time kernels to suit the needs of the system user.

The approach of this invention is based on a set of simple, small executives that execute on the bare machine and allow a general purpose operating system and a real-time kernel to share the hardware in such a fashion that (1) the real-time kernel executes in a predictable manner so that it is possible to analyze the conditions under which real-time tasks will be guaranteed to be feasible, and (2) the general purpose operating system can function correctly with few modifications. Two generic technologies are required to achieve these goals. The first is a facility for multiplexing the co-resident operating systems' execution on all shared devices. The second is a scheme for partitioning all shared, serially reusable resources such as disk sectors, network buffers, screen pixels, etc., between the operating systems.

Prototype executives for the CPU and a few other devices are described. The executives multiplex accesses to each shared device and partition device resources so that the above two goals are met. The most complex executive is that for the CPU. It operates by executing the general purpose system but preempts its execution at precise, constant intervals to execute the real-time system. Thus at a high-level, the overall system is similar to a cyclic executive as described in *The Cyclic Executive Model and Ada*, Baker, T. P., Shaw, A. C., *Real-Time Systems*, Vol. 1, No. 1, (June 1989), pp. 7–26. The cyclic executive described by, T. P. Baker et al alternates between the execution of two programs that happen to be other operating systems. Alternately, the system described herein could be viewed as an implementation of a coarse grained pure-processor-sharing scheduling algorithm as described in *A Scheduling Philosophy for Multiprocessing Systems*, Lampson, B. W., *Comm. of the ACM*, Vol., 11, No. 5, (May 1968), pp. 347–360. The scheduling algorithm described by B. W. Lampson, in accord with the improvements of the present invention, has two programs (two operating systems in this case) making forward progress at precise rates.

While the overall approach used in this invention is related to those followed in the design of several other systems as described above, it is believed that the method and apparatus according to the invention contributes a general methodology for resolving the pragmatic problem of allowing existing (and thus future) real-time and non-real-time systems technology to co-exist on the same machine. This approach provides a clean separation of real-time and non-real-time concerns and makes possible an analysis of the feasibility problems for periodic tasks that are allocated a fraction of the processors' capacity. This analysis contributes to the knowledge of real-time resource allocation problems for architectures such as cyclic executives and the others mentioned above.

There is described herein the design and implementation of the in executive in more detail. According to the invention, the executive is capable of executing the IBM Microkernel (a derivative of the Mach Microkernel) with an OSF/1 server in parallel with a simple real-time kernel as will be described. The overall framework for supporting co-resident operating systems, and the multiplexing and partitioning issues are described in detail. The implementation of the executive is described and both its performance and the impact of the executive and real-time kernel on the performance of the microkernel is assessed. The degree to which the executive can ensure a precise execution rate for the real-time kernel is described. The real-time kernel of the invention is described, and it is shown how the existing theory of scheduling periodic tasks on a single processor can be extended to incorporate the fact that the real-time kernel only executes periodically. Some of the fundamental design issues and limitations of the invention are discussed. This embodiment can be extended to other general purpose operating systems such as Windows and OS/2.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 9 is a histogram of the duration of slots over a 2:08 minute interval, for a "quiet" system according to the invention; a graph plots the number of occurrences vs. observed deviation in microsec.;

FIG. 10 is a histogram like FIG. 9 of the duration of slots over the interval, for a "busy" system; a graph plots the number of occurrences vs. observed deviation in microsec.;

FIG. 11 is a Table of execution times for execution times for a compiler build operation on the IBM Microkernel; and FIG. 12 is a Table of measured overhead in % of all processor cycles consumed for various parts of the execution of a system using the invention.

DETAILED DESCRIPTION OF THE INVENTION

Figure 1:
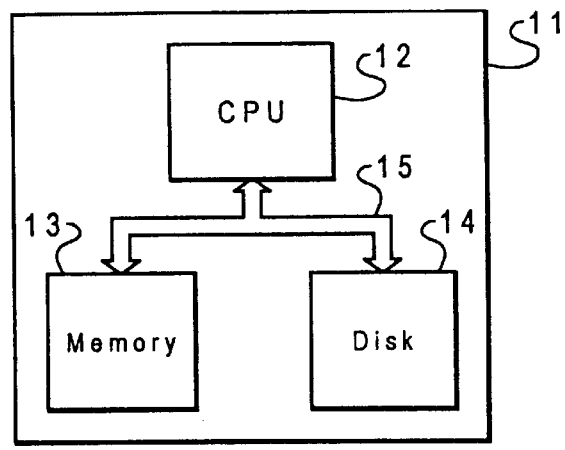
FIG. 1 is a high level block diagram of a data processing system including a general-purpose CPU, according to the prior art, and on which an organization of operating systems may be used according to the invention.

With reference now to the figures and in particular with reference to FIG. 1, there is depicted a data processing system 11. Data processing system 11 includes a system central processing unit or CPU 12, a system memory 13, a mass storage controller 14 and a communications link 15 linking the CPU 12, memory 13 and mass storage controller 15 for interchange of data and commands. Communications link 15 may be a system bus or it may represent some type of network.

Figure 2:
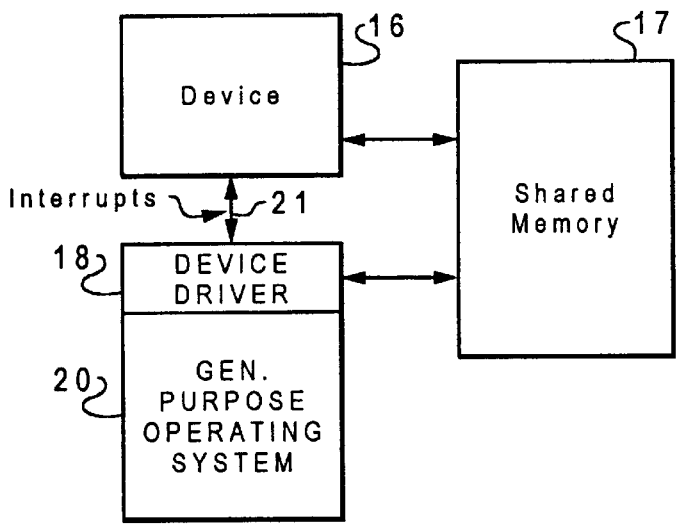
FIG. 2 is a diagram of logical device driver organization for an operating system executed on the system of FIG. 1, according to the prior art.

FIG. 2 is a representation of logical device driver organization for programs executed by the data processing system of FIG. 1, i.e., executed by the CPU 12 from memory 13 and mass storage 14, according to the prior art. A device 16 (such as the mass storage unit 14, a printer, etc.) accesses shared memory 17 using a device driver 18 which also accesses the shared memory 17. The device driver 18 executes on top of a general purpose operating system 20 which may be IBM OS/2 or the like. The device driver 18 is able to interrupt the device 16 via path 21 as its primary operating mode.

Figure 3:
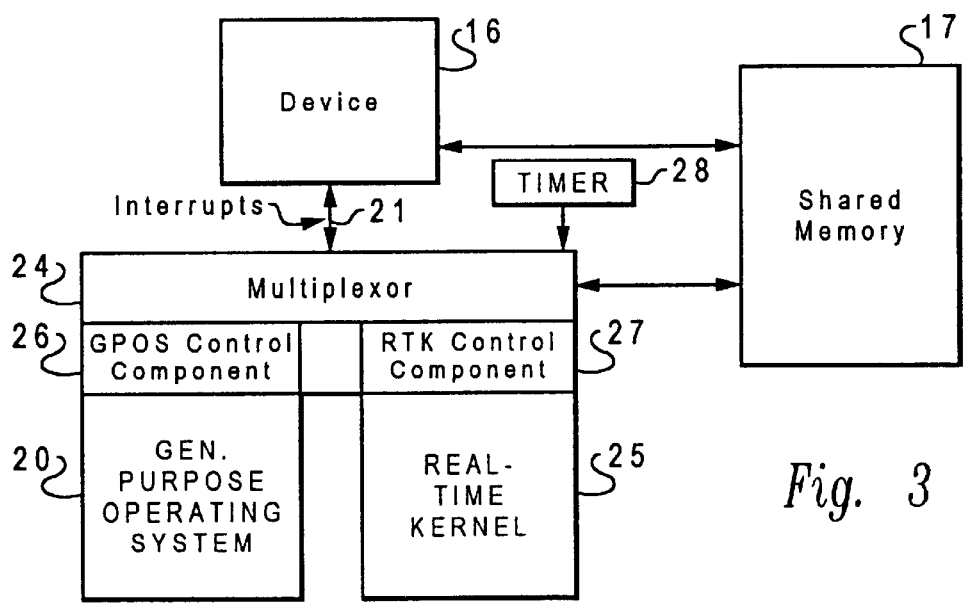
FIG. 3 is a diagram of logical device driver organization for a general purpose operating system and a real-time kernel, executed on the system of FIG. 1, according to the invention.

FIG. 3 is a representation of logical device driver organization for programs executed by the data processing system of FIG. 1, i.e., executed by the CPU 12 from memory 13 and mass storage 14, for co-resident operating systems according to one embodiment of the invention. Again, the device 16 (such as the mass storage unit 14, a printer, etc.) accesses shared memory 17 using a device driver in the form of a multiplexor 24 which also accesses the shared memory 17. The multiplexor 24 executes on top of a general purpose operating system 20 which may be IBM OS/2 or the like, and a real-time kernel 25. The multiplexor 25 is able to interrupt the device 16 via path 21 as its primary operating mode as in FIG. 2. The multiplexor 24 includes a general purpose operating system control component 26 and an RTK control component 27 as will be described.

Supporting Co-Resident Operating Systems

Two basic low-level operations required to support the two co-resident operating systems 20 and 25 of FIG. 3 are multiplexing and partitioning.

Multiplexing is the allocation of consumable resources (e.g., CPU 12 processing time, network bandwidth, etc.) to the co-resident operating systems 20 and 25. Every shared device 16 in the system that represents a consumable resource requires multiplexing. Partitioning is the allocation of serially reusable resources and requires partitioning. Memory is a serially reusable resource, in that memory locations are used over and over again, whereas CPU cycles or network bandwidth is consumed and can never be reused. These multiplexing and partitioning operations are described in greater detail below.

Multiplexing

The multiplexor 24 is a small executive that controls when and for how long each operating system 20 or 25 may use a shared device 16. There are two important issues in the design of a multiplexor 24. First, the multiplexor 24 precisely allocates (schedules) execution time on a shared device 17 to each operating system 20 or 25. This implies that the multiplexor 24 must be able to gain control of the device 16 or 17 at well-defined, precise times, and maintain control of the device for well-defined, precise durations. The acquisition and allocation process must occur at precise times if the real-time kernel is to guarantee real-time services on the device.

In general, the solution to the device acquisition and control problem is to either provide a mechanism such as an interval timer 28 to ensure that the multiplexor 24 is executed at (precise) periodic intervals, or provide a mechanism such as an interrupt via path 21 to ensure that the multiplexor 24 is executed whenever the real-time kernel 25 requests the service of the device 16 or 17. In either case, once a multiplexor 24 commences execution, it must logically execute with all interrupts to the CPU 12 disabled until it has allocated the desired units of the consumable device resource (e.g., CPU cycle allotment) to the appropriate operating system 20 or 25. For example, for the CPU multiplexer 24 described below, an interval timer is used to invoke the multiplexer 24 at regular intervals and trap all operating system calls that manipulate the current interrupt mask to ensure the multiplexer's timer interrupt is never disabled. Moreover, to ensure that the real-time kernel 25 executes without interference from the general purpose operating system 20, all interrupt sources currently in use by the general purpose operating system 20 are disallowed from interrupting the real-time kernel 25. (In general, the converse is not required to be true.) As illustrated below, experience with the invention indicates that the device acquisition and control issue is resolved without requiring detailed knowledge (e.g., source code) of either operating system 20 or 25.

The second problem, and one that complicates solutions to the first, is that of maintaining the consistency of data structures within shared memory 17 that control the operation of, and describe the current state of a device. Unless all device operations are atomic, critical sections will exist between the co-resident operating systems with respect to their individual use of the device. These critical sections must be discovered and locked so that one operating system 20 or 25 cannot preempt the second's use of the device 16 while the second is executing inside a critical section of memory.

The critical section issue is not as easily resolved as the acquisition and control issue. The ideal resolution wold be to examine the source code for each operating system 20 and 25 to discover precisely how it interacts with the device 16; however, this is clearly not always feasible. For peripheral devices this problem is manageable as often both the abstract paradigm of a general purpose operating system's interaction with a device, as well as the device manufacturer's paradigm of device interaction, are well-documented in developers' guides. In general, the critical sections of interest often involve static memory locations or special instruction opcodes for manipulating special registers and thus critical sections can be located by searching the object code and the binary can often be modified without access to the source. In designing CPU multiplexer 24 in an example embodiment, however, the source code is relied on for the IBM Microkernel to verify all inter-operating system critical sections had been locked out.

Partitioning & Device Management

Figure 4:
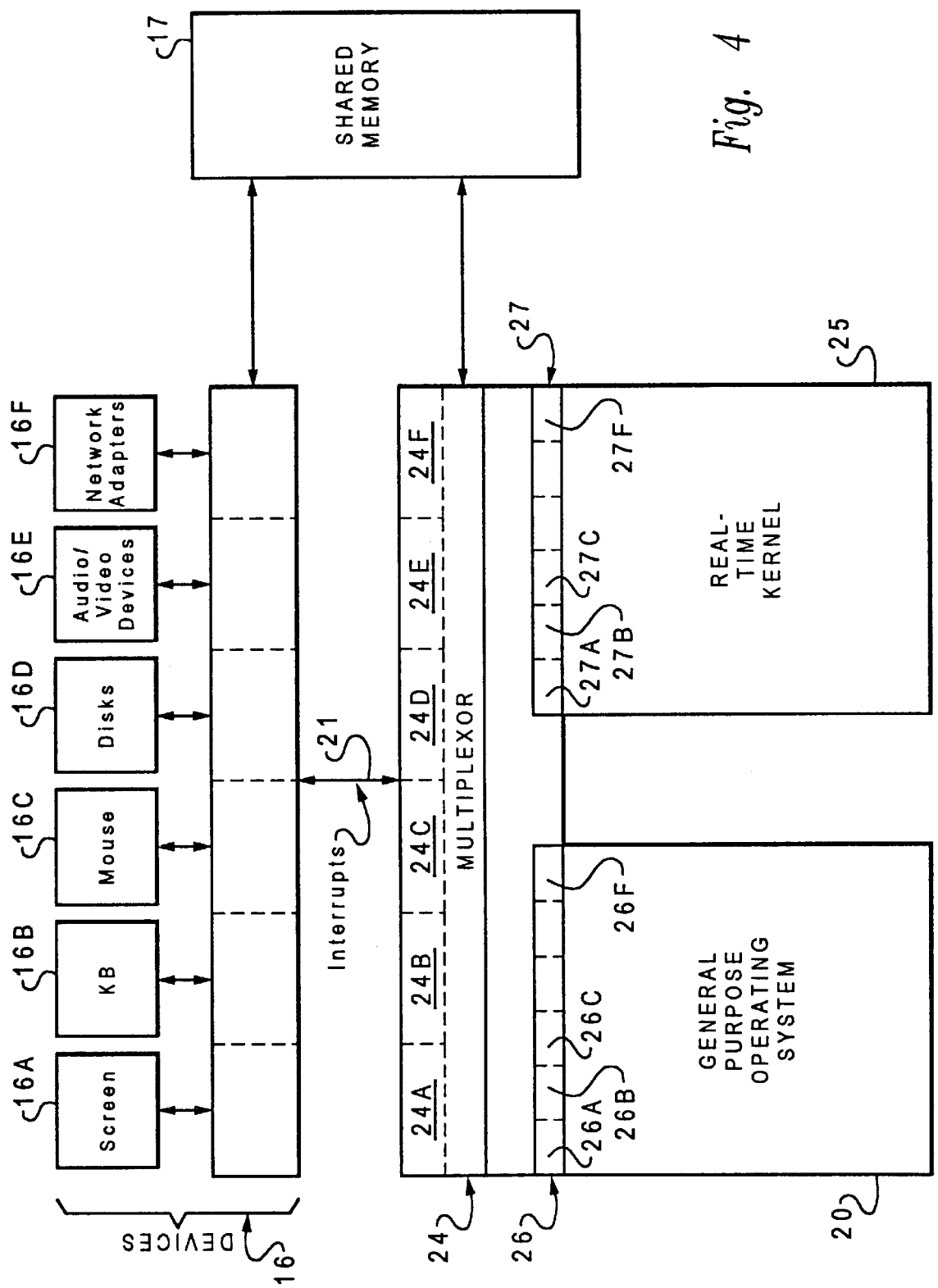
FIG. 4 is a diagram of logical device driver organization like FIG. 3 for a general purpose operating system and a real-time kernel, showing drivers typically used in a system of FIG. 1, according to the invention.

Referring to FIG. 4, most peripheral devices such as the screen 16A, keyboard 16B, mouse 16C, disks 16D (such as mass storage 14), audio/video devices 16E, and network adapters 16F typically contain serially reusable resources that must be shared between the co-resident kernels 20 and 25. These resources must be partitioned, either statically or dynamically between the two systems 20 and 25.

The general framework for device management is illustrated in FIG. 4. Each shared device 16A–16F has a corresponding multiplexer 24A–24F, a corresponding general purpose operating system control component 26A–26F, and an real-time kernel control component 27A–27F. This multiplexer 24 is as described above. The general purpose operating system and real-time kernel control components 26A–26F and 27A–27F implement the general purpose operating system's and real-time kernel's desired view of the device 16A–16F and are responsible for partitioning whatever shared resources such as memory 17 exist on the device. The control components are, in essence, device drivers modified to operate in concert with each other.

In general the details of resource partitioning are necessarily device specific. For simple devices such as a memory mapped display (console), e.g., screen 16A, the general purpose operating system control component 26A can be the unmodified driver for the display, and the real-time kernel control component 27A can be a simple user program executing on the general purpose operating system 20. In this scenario, the real-time kernel control component 27A requests screen real-estate and instructs the general purpose operating system' display manager to ignore the pixels allocated to the real-time kernel component 27A. Processes within the real-time kernel 25 are then free to write directly to the screen memory corresponding to these pixels. (Indeed, this scenario is precisely how many video display systems work since they cannot rely on the window system to display video data at the desired frame rate.) Moreover, in this case, since screen output is performed by writing to physical memory locations, and these operations are atomic, the multiplexer 24A is trivial to construct since there are no inter-operating system critical sections.

Note that the generic devices 16A-16F that are used only by the general purpose operating system 20 require no special effort to support. Their interrupts will only be serviced, and their device drivers will only execute when the general purpose operating system 20 executes. Thus the real-time kernel multiplexer 27A and the CPU multiplexer 26A need not have any knowledge of their existence. Devices that are used only by the real-time kernel 25 do not require a multiplexer 24 but do require an real-time kernel control component 27A (i e., a device driver) and may require a general purpose operating system control component 26A. The general purpose operating system control component 26A may be required to handle interrupts via path 21 from the device that occur during the execution of general purpose operating system 20.

A CPU Executive and Its Performance

Figure 5:
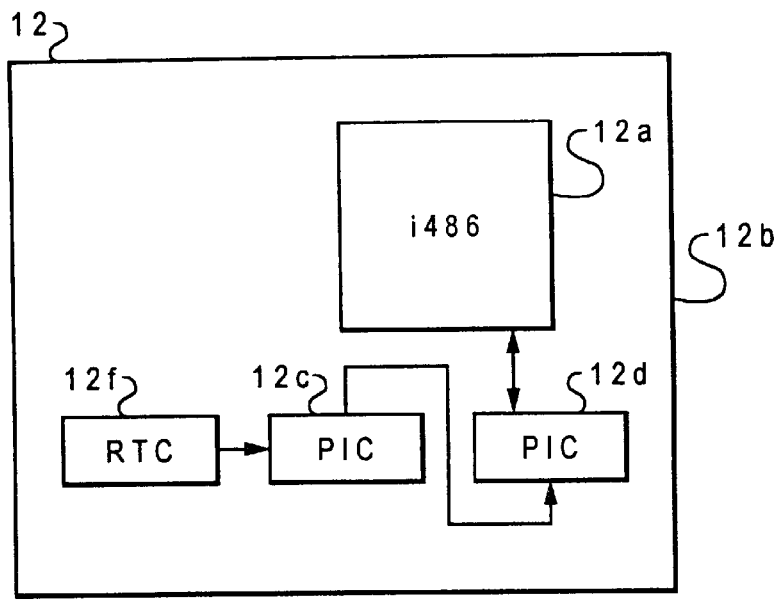
FIG. 5 is a block diagram of a CPU motherboard using constructed using PICs and a real-time clock according to one embodiment.

Referring to FIG. 5, the design, implementation, and performance of a CPU executive for an IBM PS/2 workstation will be described. The executive multiplexes the CPU between the IBM Microkernel and an OSF/1 Unix server, and a simple generic real-time kernel which has been developed. It also partitions two low-level system data structures between the two operating systems. The data structures are used by the hardware to realize tasks and address spaces. The IBM/OSF/1 system executes normally on top of the executive while the real-time kernel executes in a highly predictable manner. The following paragraphs describe the multiplexer 24 and the partitioning of data structures, and demonstrate that the real-time kernel 25 executes in a predictable manner.

In building the CPU executive, access to the source code for the IBM Microkernel allowed verification of understanding of how to partition data structures. The design of the CPU executive required the combined addition and modification of less than 100 lines of assembler in the Microkernel.

Hardware and Executive Description

Figure 6:
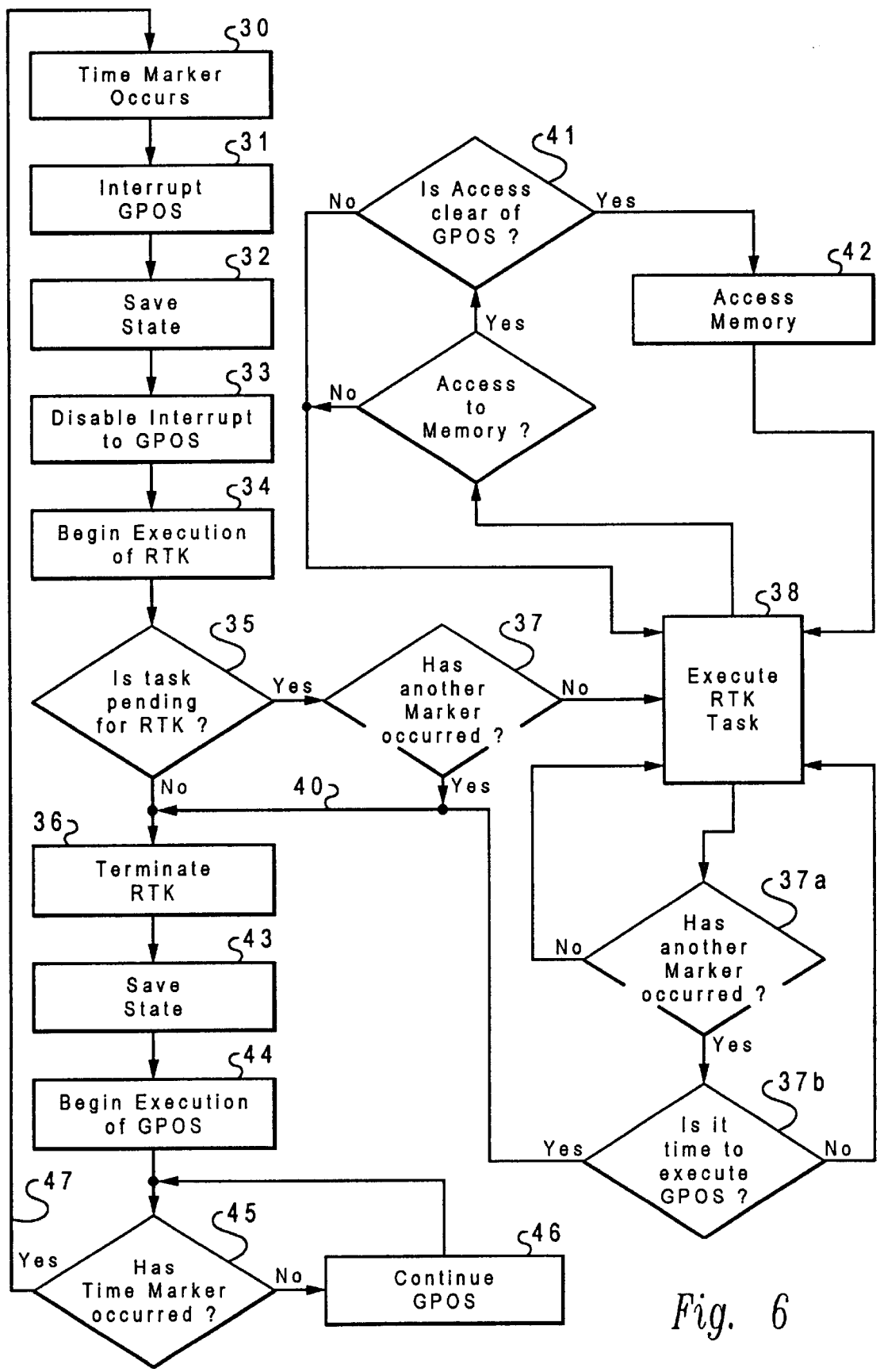
FIG. 6 is a logic flow chart of an executive according to one embodiment.

Referring to FIGS. 5 and 6, the design, implementation (hardware and software), and performance of a CPU executive for one embodiment using an IBM PS/2 Model 95 workstation (employing a 66 MHz Intel 80486 microprocessor 12a, referred to below as an i486), will be described. Details of the IBM PS/2 system are given in *The IBM Personal System/2 Hardware Interface Technical Reference*, IBM, 1st Edition, 1988. *The IBM Personal System/2 Model 95 XP486 Technical Reference*, IBM, 4th Edition, 1992. In FIG. 5, a number of integrated circuits are on the motherboard 12b in this embodiment. There are two programmable interrupt controllers (PICs) 12c and 12d, which in this embodiment are Intel 8259A peripheral support chips and one programmable interval timer 12e, as described in *Peripheral Components*, Intel Corporation, Mt. Prospect, Ill., 1993; and there is one real-time clock (RTC) 12f which is a Motorola MC146818A Real-Time Clock Plus RAM as described in *Motorola Semiconductor Technical Data*, Motorola A Microprocessor Data, Motorola Design-NET, 602-244-6591. The PICs 12c and 12d multiplex interrupts from peripheral devices 16A–16F and other circuits on the motherboard 12b onto the single interrupt line 21 of the CPU 12a. In addition, the PICs 12c and 12d provide a means to assign priorities to interrupt generators and a bit mask which can enable and disable each device 16A–16F. Each PIC 12c and 12d has eight input lines and there are two cascaded PICs 12c and 12d on the motherboard 12b. Inside the i486 CPU 12a, interrupts from the PICs are enabled and disabled by setting or clearing the interrupt (IF) bit in the i486 flags register. Setting and clearing the IF bit is performed by an i486 machine instruction. Detail of this flags register and the setting and clearing the IF bit, as well as other details of construction, operation and programming of the i486 are described in detail in *Microprocessors: Volume II*, Intel Corporation, Mt. Prospect, Ill., 1993.

In addition to being able to keep real-time, the RTC 12f in the embodiment of FIGS. 5 and 6 also provides a programmable interval timer. The interval may be set to one of sixteen values from 30.5 microseconds to 500 milliseconds. At the end of each interval the RTC 25 will generate an interrupt. As described below, this embodiment uses the RTC 25 to provide periodic interrupts via line 21 to the CPU executive at the (arbitrarily chosen) rate of one interrupt every 488.281 microsec. Intervals of this duration are referred to as slots as described below.

Referring to FIG. 6, a logic flow chart of a simplified example of an executive according to one embodiment of the invention, is illustrated. At block 30, while GPOS 20 has control, a marker from the RTC 12f has occurred. The CPU is interrupted as represented by block 31, and state is saved as represented by block 32. Interrupts to the CPU are disabled as seen by block 33. Then, execution of the RTK 25 begins at block 34. A decision block 35 determines whether a task is pending for the RTK, if not control passes to terminate the RTK at block 36. If a task is pending for the RTK, a decision point 37 is used to determine if too much time has elapsed since entering execution of the RTK, and if so then control passes to terminate the RTK at block 36. If not, the RTK task begins or continues at block 38. A decision point determines if access to a shared resource such as memory 17 is occurring in this execution of a task, and if not execution continues in a loop until completed via path 40. If so, then there is a check to see if this access is clear of the use of this resource by the GPOS, at block 41, and if clear then access is made at block 40 and execution continues via block 38. If not clear, then some step is taken to clear the shared access as by reallocating memory, then execution continues via block 38. This loop continues until either the tasks are completed or another marker occurs, then control passes to the terminate RTK block 36. While the RTK task is executing, a continual test of whether another marker has occurred is make at block 37a and if so a test is made at block 37b to see if it is time to execute the GPOS; if so, control passes to block 36 via path 40; if not execution of the RTK task continues via block 38. When the terminate block 38 is reached, state is saved for the RTK tasks and OS, at block 43, and execution of the GPOS 20 begins at block 44. Execution of the GPOS and tasks under the GPOS continue until another time marker occurs as detected at decision block 45, and execution continues via block 46, until the block 45 shows a Yes output, in which case control passes via path 47 to beginning block 30. Note that by time marker is meant that the correct number of slots as described with reference to FIG. 7 have occurred, not merely a single time period.

Multiplexer

Figure 7:
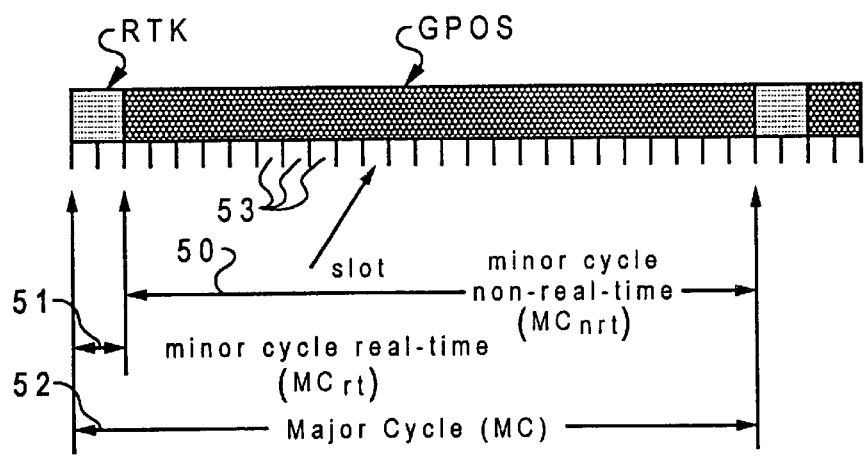
FIG. 7 is a timing diagram of the multiplexing of non-real-time general purpose operating system and a real time kernel, according to the invention.

Referring to FIG. 7, the paradigm of CPU multiplexing adopted for this embodiment is to alternate between executing the general purpose operating system 20 for $mc_{nrt}$ contiguous time units during interval 50, and executing the real-time kernel 25 to form $mc_{rt}$ contiguous time units in interval 51. Borrowing terminology from the cyclic executive literature as described in the T. P. Baker et al referenced above, an execution of a general purpose operating system 20 followed by an execution of the real-time kernel 25 is called a major cycle MC, i.e., time interval 52. The slots 53 as described just above are seen to be much shorter than a major cycle 52. The execution of each operating system 20 or 25 is referred to as either a real-time or a non-real-time minor cycle. The duration of a real-time and non-real-time minor cycle is given by parameters $mc_{rt}$ and $mc_{nrt}$, respectively. The length of a major cycle MC is thus $mc_{nrt}+mc_{rt}$. The logical behavior of a CPU multiplexer 24 is then completely described by the pair ($mc_{nrt}$, $mc_{rt}$).

The multiplexer 24 is driven by interrupts from the RTC 25. The multiplexer 24 allocates the CPU 12a to the co-resident operating systems in units of slots 53. In an embodiment, $mc_{nrt}$=24 slots=11.72 ms, $mc_{rt}$=2 slots=0.976 ms, and MC=26 slots=12.7 ms. Thus the general purpose operating system 20 receives approximately 92% of all processor cycles (minus overhead) and the real-time kernel 25 receives the remaining 8% (minus overhead). Both the size of a slot 53 and the size of minor cycles 50 and 51 are parameters selected by the designer. The small slot 53 and minor cycle 50 and 51 sizes in this embodiment are chosen to stress the implementation and to ensure good response for the general purpose operating system 20.

In order to guarantee precise execution of the real-time kernel 25, the multiplexer 24 must ensure that its real-time kernel clock interrupts are never disabled and that the time between the occurrence of a clock interrupt and the start of the execution of its handler is bounded. All locations in the microkernel that manipulate the IF bit in the flags register and modify the kernel are recognized so that interrupts remain enabled but configure the PICs 12c and 12d so that only the RTC 25 can generate an interrupt. Since the RTC interrupt is handled by the CPU executive, the microkernel is unaffected by this modification.

The implementation of the CPU executive itself requires that interrupts be disabled to enforce mutual exclusion inside critical sections within the executive of FIG. 6. The maximum length of these critical sections is approximately 200 CPU 12a cycles. On the hardware used in this embodiment, each CPU cycle is 15 nanoseconds, hence the maximum time by which the RTC 25 interrupt can be delayed because of actions of the executive is approximately 3 µs.

The RTC interrupt handler is designed as an i486 hardware task with an i486 task descriptor in the interrupt vector table. When the hardware detects this type of descriptor on an interrupt, the complete state of the currently executing process is saved in a i486 Task State Segment (TSS) by the hardware. This type of interrupt handling mechanism is more costly in code and time than a typical interrupt; however, the RTC handler is implemented this way to minimize changes to the general purpose operating system 20 and to provide complete separation between the general purpose operating system 20 and the CPU executive. The RTC interrupt handler calls the CPU executive to determine which of three cases the executive may be in. The cases are: the start of a real-time minor cycle 51, the start of a non-real-time minor cycle 50, or the start of a slot 53 in the middle of a minor cycle 50 or 51. If the system is in the middle of a minor cycle, the RTC interrupt handler resets the RTC and PICs, and calls the CPU executive dispatcher to resume the preempted task. If it is time to start a real-time or non-real-time minor cycle 50 or 51, the executive saves the state of the previously executing task and resumes the appropriate operating system 20 or 25.

This embodiment of the multiplexer requires only two basic modifications to the IBM Microkernel. First, as described above, all operations on the i486 flags register involving the IF bit had to be trapped and emulated to ensure the RTC interrupt is never disabled. These operations occur in only a few places such as the first level interrupt handler of the microkernel and are easily located in the code. Second, the microkernel code that performs a task switch is treated as a critical section as it manipulates data structures used by the hardware task switching mechanism. Although the IBM Microkernel does not use the hardware task switch mechanism, the CPU executive does. Hence, these data structures must always be in a consistent state in order for the CPU executive to use the hardware mechanisms for saving and restoring general purpose operating system state. This is accomplished by disabling all interrupts during execution of the microkernel task switching routines. The microkernel is, of course, already disabling interrupts for this routine; it is simply necessary to ensure that the interrupt disabling emulation code does not execute in this one case.

Partitioning of System Data Structures

Figure 8:
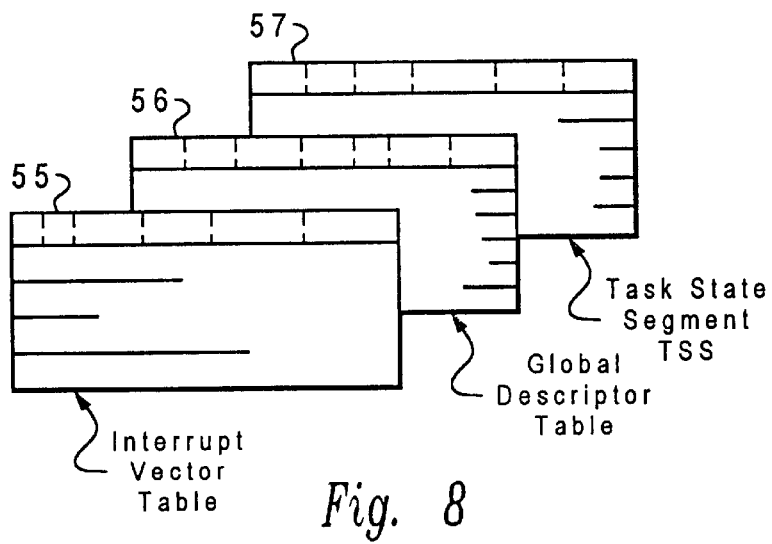
FIG. 8 is a diagram of an interrupt vector table, a global descriptor table, and a task state segment, used in a 486 microprocessor, according to one embodiment.

Referring to FIG. 8, there are three i486 data structures that are used by virtually all i486 operating systems and thus are partitioned between the general purpose operating system 20 and the real-time kernel 25 in the example embodiment. These are the interrupt vector table 55, the global descriptor table 56 and the task state segment TSS 57. Since an existing general purpose operating system 20 is used in the embodiment, the general purpose operating system 20 currently has these data structures mapped in its kernel's address space. The problem is to discern the mapping and partition the structures.

The interrupt vector table 55 is an array of i486 memory descriptors in the general purpose operating system kernel 20a. After the i486 CPU 12a acknowledges an interrupt from the PICs 12c and 12d, the master PIC places an 8-bit value on the bus. This value is both the interrupt number and an offset into the interrupt vector table 55. The PICs 12c and 12d are initialized with the value to use as the interrupt number for each of the devices 16 that may be attached. The memory descriptors in the interrupt vector table 55 contain information about a segment of memory 13, including its virtual address in either kernel or user space, permission values, and type information for the object residing at the memory location. The partitioning of this table 55 must allow the CPU executive to install an entry in the table for the RTC interrupt handler. The IBM Microkernel did not use the RTC and thus that entry in the interrupt vector table was free. In general, for devices that are not shared between operating systems or the CPU executive, the partitioning of the interrupt vector table 55 is straightforward. For devices that are shared, such as a disk 16D, the partitioning must occur at a higher-level such as in the device driver.

The global descriptor table (GDT) 56 also holds a number of i486 memory descriptors; however, unlike the interrupt vector table 55, it can hold descriptors for data segments as well as code segments. The i486 descriptor table 56 contains several thousand entries; however, less than 10 are used by the IBM Microkernel. In the embodiment, descriptors in the GDT 56 are used to identify real-time kernel data and code segments. This is necessary because the IBM Microkernel uses the values of the code and data segment offsets in the GDT 56 to identify the type of code (user or system) currently executing and makes various internal decisions based on that determination. Thus, the GDT 56 itself is partitioned and that partitioning results in the partitioning of the microkernel's address space. Although the partitioning of the GDT 56 and the microkernel address space is needed for this particular embodiment, it is not necessary in general.

The TSS 57 is required by the i486 for two reasons. It holds the address of the stack an interrupt handler must use when it is interrupting a user process and it contains a permission mask that is checked when a user process accesses an IO port. The IBM Microkernel uses only those two fields in the TSS 57. The other fields of the TSS 57 hold enough information to completely restore a process to running state after it has been swapped out. The CPU executive s the unused fields in the TSS 57 for just this purpose.

Performance

There are two primary performance issues of interest in operation of the invention. The first concerns the CPU executive's ability to reliably invoke the real-time kernel 25 at periodic intervals, e.g., slots 53. The second is a measurement of the overhead of the CPU executive and the performance degradation suffered by the general purpose operating system 20.

The CPU executive is designed to gain control of the machine at the start of every slot 53 (i.e., once every 488 μs). The real-time kernel 25 can predictably execute tasks in real-time if and only if it is guaranteed to execute at well-defined times and for precise durations. Therefore, an important measure of the predictability of the executive and therefore of the real-time kernel 25, is the observed deviation in slot 53 duration. FIG. 9 shows a histogram of the observed deviations in slot 53 times from 488 μs; this data represents a "quiet" system in which no user processes are running on either the general purpose operating system 20 or real-time kernel 25. Data for a "busy" system is shown in FIG. 10 in which a copy of the IBM Microkernel is being compiled from a local disk, telnet and ftp sessions are active, and the real-time kernel 25 is executing real-time tasks. As expected, the distribution of deviations is approximately symmetrical since if slot i is lengthened by t μs, slot i+1 is typically shortened by t μs.

The worst empirically measured deviation in a slot duration in FIGS. 9 and 10 is 34 μs or 7%. In general, deviation is due to a number of factors which are generic and thus transcend the particular system architecture of the embodiment. Deviation is caused by a. inter-operating system critical sections which require all interrupts be disabled (the dominant cause), b. critical sections in the CPU executive (resulting in deviations of ±3 μs, c. the CPU executive timer interrupt handler, and d. the measurement, code itself (without the histogram data collection code, the largest observed deviation was 27 μs, or 5.5%.

DMA memory cycle stealing also contributes to the variation as it inflates the execution times of all critical sections.

Although the control of slot durations is not as precise as would be preferred, it is paramount to realize that the phenomena that causes this deviation are generic and thus apply to all real-time kernels. Indeed, for the Real-Time Mach kernel, measurements indicate that some of its timing and scheduling mechanisms exhibit considerably more variation than the CPU executive and real-time kernel 25, as described in *A Flexible Real-Time Scheduling Abstraction: Design and Implementation,* Lo, S. L. A., Hutchinson, N. C., Chanson, S. T., Technical Report, University of British Columbia, 1994.

To assess the overhead of supporting co-resident kernels, a computationally and I/O intensive task, the compilation of the IBM Microkernel, may be executed the way its execution time is affected by device executives and the real-time kernel 25 may be measured. In FIG. 11, Table 1 assesses the overhead of the CPU executive. Shown are the times required to compile the microkernel under a variety of environments. Experiment 1 consists of building the kernel on an unmodified version of the microkernel. The second experiment repeated the kernel build but on a version of the microkernel that had been modified to emulate interrupt enabling and disabling.

The second experiment had no CPU executive present; hence, it shows the increase in elapsed time due to the overhead of the interrupt enable/disable emulation. This overhead increased the build time a approximately 2%.

The third experiment of Table 1 extended the second experiment by adding in the CPU executive and generating RTC timer interrupts (every 488 μs) that are handled by the executive. In this experiment, there is no real-time kernel 25; hence, this illustrates the total overhead of the CPU executive. When the CPU executive runs, it simply returns control to the general purpose operating system 20. This overhead added an additional 9% to the kernel build time.

It is important to note that this increase is only due in part to the actual interruption of the general purpose operating system 20 and the execution of the CPU executive. When the general purpose operating system 20 is interrupted as frequently as it is, its main memory cache performance starts to suffer due to context switching. It is believed that disk throughput is also similarly affected. It is believed that as much as 4–5% of the increase in kernel build time from experiments 1 to 3 is due to memory cache degradation. The total observed increase in elapsed time for the kernel build imposed by the CPU executive alone is approximately 12%.

The final experiment (4) in Table 1 executes real-time tasks inside the real-time kernel to consume all cycles allocated to the real-time kernel 25. This slows down the kernel build by 20%.

In FIG. 12, Table 2 shows the fraction of the processor time consumed by each component of the CPU executive and by the real-time tasks. Given the size of the multiplexer time slot 53, the real-time kernel 25 should have had 7.7% of the processor; however, the real-time tasks were able to consume approximately 6.9% of the total processor cycles. This difference is explained by the fact that the RTK is subject to the same overhead as the GPOS for processing RTC timer interrupts. As RTC interrupt processing consumes 8.4% of the processor, the available processing time in each real-time (and non-real-time) slot is decreased by 8.5%. This reduces the expected maximum real-time task utilization to approximately 7.1%. This difference between the observed utilization and this bound is due to scheduling overhead within the real-time kernel 25.

In summary, multiplexing and partitioning CPU resources are provided such that the real-time kernel 25 executes in a highly predictable manner and the general purpose operating system 20 both functions correctly and is slowed down by only 12% above the degradation expected by the presence of the real-time tasks. All this is accomplished with a minimal number of modifications to the general purpose operating system 20.

A Simple Real-Time Kernel

The real-time kernel 25 will be briefly described. As the kernel itself is rather mundane, the emphasis is on the paradigm of interaction and communication between general purpose operating system 20 tasks and real-time kernel 25 tasks. This paradigm is specific to the IBM Microkernel and the real-time kernel 25 is written with the knowledge that it would co-exist with the IBM Microkernel and thus takes advantage of its features.

The real-time kernel 25 consists of a bare machine kernel 25a and a microkernel server 25b that is used for communication between the IBM Microkernel general purpose operating system 20 and the real-time kernel 25. The physical mechanism for the communication is memory 17 that is shared between the microkernel 20 and the real-time kernel 25. Real-time tasks are written and compiled within the OSF/1 server 25b that executes on top of the microkernel 25a. A task is written as a C function. Upon requests from a Unix process, the real-time kernel microkernel server 25b copies the code that will become an real-time kernel task, from user space to microkernal space in memory 17 (using existing IBM Microkernel system calls) and communicates a number of parameters to the real-time kernel 25 via shared memory 17. The parameters include the logical starting address of the task, the period of the task, and the cost in CPU time required by the task during one period. These parameters are used by the real-time kernel's scheduler to determine when to execute the task. The real-time kernel also constructs a TSS 57 for this task by setting the instruction pointer field of the TSS to the address passed in from the real-time kernel microkernel server 25b and a set of initial values common to all real-time kernel tasks. The task is invoked in the next real-time minor cycle and once during every one of the tasks's periods thereafter.

Theoretical Underpinnings

In order for the improvements herein described to be used, programmers should be able to determine the conditions under which their real-time tasks will be feasible. For the particular design of a CPU executive that allows the real-time kernel 25 to execute periodically, necessary and sufficient conditions may be developed for executing a set of periodic tasks in real-time inside a real-time kernel. First some related work is described.

Related Work

The starting point for this analysis is the hybrid static/dynamic priority scheduling model presented in *Scheduling Algorithms for Multiprogramming in a Hard-Real-Tie Environment*, Liu, C. L., Layland, J. W., Journal of the ACM, Vol. 20, No. 1, (January 1973), pp. 46–61, and solved exactly in *Accounting for Interrupt Handling Costs in Dynamic Priority Task Systems*, K. Jeffay, D. L. Stone, Proc. 14th IEEE Real-Time Systems Symp., Raleigh-Durham, N.C., December 1993, pp. 212–22. The model considered in these works partitions all computations performed in the system into those scheduled according to a static priority assignment and those scheduled according to a dynamic priority assignment. In essence, the system executes in two modes: whenever work with a static priority assignment arrives in the system, it is scheduled for execution by a static priority scheduler; whenever there is no static priority work remaining, work with dynamically assigned priority is scheduled for execution by a dynamic priority scheduler. In this model, static priority work takes precedence over dynamic priority work. For example, in K. Jeffay et al a real-time system consisted of a set of interrupt handlers that executed in response to periodic interrupts, and a set of periodic application tasks. Interrupt handlers were assigned a static priority equal to the interarrival time of their corresponding interrupt (e.g., a rate-monotonic priority assignment) and application tasks used their current deadline as their execution priority. Interrupt handlers always had priority over application tasks.

The results of the analysis for hybrid static/dynamic priority scheduling models from the K. Jeffay et al article can be applied here by, for example, modeling the system as a set of real-time periodic tasks and a single static priority periodic task with execution cost $mc_{nrt}$ and period MC that "executes" the non-real-time processing workload. However, since in this vision of the system there is only one "static priority task," this system is a special case of the more general model studied in K. Jeffay et al; there the feasibility conditions were expressed n terms of a recurrence relation. For the special case considered here, a more appealing closed form solution can actually be generated.

Formal Model and Analysis

Time can be considered to be a sequence of (discrete) clock ticks. Ticks are indexed by the natural numbers and the interval between successive clock ticks is referred to as a time unit. Further consider a dichotomy of time units: real-time units and non-real-time units. A major cycle 52 as in FIG. 7 is a sequence of MC=$mc_{nrt}$+$mc_{rt}$ time units; $mc_{nrt}$ contiguous non-real-time time units 50 and $mc_{rt}$ contiguous real-time time units 51. Time is organized as an endless sequence of major cycles. Real-time tasks execute only during real-time time units and non-real-time tasks execute only during non-real-time time units.

For simplicity, consider a real-time task to be a periodic task as described by C. L. Liu et al. Specifically, task T is a pair (c,p) where c is the maximum amount of processor time required to execute task T to completion on a dedicated uniprocessor, and p is the interval between successive invocations of T. That is, a task initially invoked at some time t with successive invocations occurring every p time units thereafter. The $i^{th}$ invocation of T occurs at time t+(i−1)p and must complete execution no later than the deadline of t+ip. This will require that c units of processor time be allocated to the execution of T in the (closed) interval [t+(i−1)p, t+ip]. If this does not occur, then task T is said to have missed a deadline at time t+ip.

It is assumed that task invocations occur at clock ticks and that parameters c and p are expressed as integer multiples of time units.

A task set r is defined as a set of n tasks $(c_1,p_1) \ldots (c_n, p_n)$. With respect to a task set, the primary measure of interest is feasibility. A task set is feasible if it is possible to schedule the tasks such that each invocation of each task completes execution at or before its deadline.

Lemma 1: For all I, I≧0, $$\left\lfloor \frac{I}{MC} \right\rfloor mc_{rt} + \mathrm{MAX}(0, I \bmod MC - mc_{nrt}) \qquad (1)$$

is the greatest lower bound on the number of real-time processor units in the interval [t, t+I].

Proof. For all t, t≧0, the interval [t, t+I] contains at least $\lfloor I/MC \rfloor mc_{rt}$ real-time processor units and at least $\lfloor I/MC \rfloor$ $mc_{nrt}$ non-real-time processor units. Of the remaining $$I - \left\{ \left\lfloor \frac{I}{MC} \right\rfloor mc_{rt} + \left\lfloor \frac{I}{MC} \right\rfloor mc_{rt} \right\} = I - \left\lfloor \frac{I}{MC} \right\rfloor MC = I \bmod MC$$

processor units in the interval, at most $mc_{art} > I \bmod MC$, then at least $I \bmod MC - mc_{art}$ additional processor units must be real-time units. Therefore, the greatest lower bound on the number of real-time processor units in the interval [t, t+I] is $$\left\lfloor \frac{I}{MC} \right\rfloor mc_{rt} + \text{MAX}(0, I \bmod MC - mc_{nrt})$$

Theorem 2: A set of periodic tasks $\tau = \{(c_1,p_1), (c_2,p_2), \ldots ,(c_n,p_n)\}$ can be executed on a CPU multiplexer with parameters $(mc_{nrt}, mc_{rt})$ if and only if for all $L \geq 0$ $$\left\lfloor \frac{I}{MC} \right\rfloor mc_{rt} + \text{MAX}(0, L \bmod MC - mc_{nrt}) \geq \sum_{i=1}^{n} \left\lfloor \frac{L}{\Pi} \right\rfloor c_i \quad (2)$$

where $MC = mc_{rt} + mc_{rt}$.

Proof: ($\Rightarrow$) A set of tasks can be scheduled only if for all $I \geq 0$, the amount of processor time available to real-time tasks in the interval [0,I], is at least as big as the work requested by invocations of tasks with deadlines in [0,I].

In [0,I], each real-time task will require $\lfloor I/P_i \rfloor c_i$ units of processor time to ensure no invocation of the task misses a deadline in the interval [0,I ]. Thus, the work requested by jobs of all tasks in [0,I ] is $$\Sigma_i^n = t \lfloor I/p_i \rfloor c_{iSUMi}^n = t \lfloor I/p_i \rfloor c_i.$$

By Lemma 1, the amount of processor time available to real-time tasks in the interval [0,I] is at least (1). Thus, since (1) is a greatest lower bound, T can be scheduled only if $$\left\lfloor \frac{I}{MC} \right\rfloor mc_{rt} + \text{MAX}(0, I \bmod MC - mc_{nrt}) \geq \sum_{i=1}^{n} \left\lfloor \frac{I}{p_i} \right\rfloor c_i$$

Note that no assumptions are made (or needed) about whether or not time 0 corresponds to the start of a major cycle.

$\Leftarrow$ To show the sufficiency of (2) it is shown that if task system T satisfies (2) for all L, L>0, then a deadline driven scheduler will succeed in scheduling T. This is shown by contradiction.

Assume for all L, L>0, T satisfies (2) but yet a real-time task in T missed a deadline when scheduled according to a deadline driven algorithm. Let $t_d$ in which no real-time task executed (or 0 if all processor units up to time $t_d$ have been consumed), or, the latest Ume prior to $t_d$ at which an invocation of a real-time task with deadline after time $t_d$ executes (or 0 if such an invocation dos not execute prior to $t_d$).

By choice of t, no invocation of a real-time task with deadline after $t_d$ executes in the interval $[t,t_d]$. If deadline driven scheduling is performed, then the processor demand in the interval $[t,t_d]$, is $$\Sigma_i^n = I \lfloor (t_d - t)/p_i \rfloor c_i.$$

Moreover, at least $$\left\lfloor \frac{t_d - t}{MC} \right\rfloor mc_{rt} + \text{MAX}(0, (t_d - t) \bmod MC - mc_{nrt})$$

real-time processor units are available for real-time tasks in $[t,t_d]$. Since a deadline is missed at time $t_d$ it follows that $$\sum_{i=1}^{n} \left\lfloor \frac{l_d - l}{p_i} \right\rfloor c_i > \left\lfloor \frac{l_d - l}{MC} \right\rfloor mc_{rt} + \text{MAX}(0, (t_d - t) \bmod MC - mc_{nrt}).$$

However, this contradicts the assumption that T satisfies (2) for all L. Hence, if T satisfies (2 then a deadline driven scheduler will succeed in scheduling T. It follows that satisfying (2) for all L,L>0, is a sufficient condition for feasibility.

The proof of Theorem 2 also establishes the optimality of the deadline driven scheduling algorithm for scheduling real-time task sets on a co-resident real-time kernel as the condition that is necessary for feasibility is sufficient for ensuring the correctness of the EDF algorithm.

Note also that as was the case with the task model in the K. Jeffay et al article, feasibility here is not a function of processor utilization. In particular it is not the case that the relation $$\sum_{i=1}^{n} \frac{c_i}{p_i} \leq 1 - \frac{mc_{rt}}{MC} = 1 - \frac{mc_{nrt}}{MC}$$

is a sufficient condition for feasibility (consider the case of an unfeasible single task $(c,p)=(3,12)$, $c/p=0.25$, when $mc_{rt}=2$, $mc_{nrt}=5$, $MC=mc_{rt}+mc_{nrt}=7$, $mc_{rt}/mc=0.286$). In general, it is possible to construct both feasible task sets with processor utilization equal to $mc_{rt}/MC$ and infeasible task sets with processor utilization arbitrarily close to 0. An interesting special case in which feasibility is a function of processor utilization occurs when for all tasks, each $c_1$ is a multiple of $mc_{rt}$ and each $p_1$ is a multiple of MC; see *A Slotted Architecture For Real-Time Processing*, G. Bollella, Technical Report, Department of Computer Science, University of North Carolina, July 1992.

Complexity of Deciding Feasibility

In general, deciding if a task set satisfies (2) requires exponential time as (2) must be evaluated for all L up to, for example, the least common multiple of the periods of the tasks. However, if $$\Sigma_i^n = 1 c_i/p_i < mc_{rt}/MC,$$

(i.e., the real-timetasks do not use all the processor time available to them) then a result can be applied (Theorem 3.6) from the K. Jeffay article which states that a set of tasks will be feasible if and only if (2) holds only for values of L that are multiples of one of the $p_i$ up to the value $$B = \sum_{i=1}^{n} \frac{c_i}{p_i} \bigg/ 1 - \frac{mc_{rt}}{MC}.$$

In this case, feasibility can be decided in time $O(n^2+P)$, where P is the period of the smallest task; see the K Jeffay article.

Discussion

The utility of this approach to integrating real-time and non-real-time technology depends largely on the implicit premise that executives can be constructed with modest effort for all shared devices and that general purpose operating systems and real-time kernels (if not developed from scratch) can be modified to accommodate these executives. It is shown that for certain devices and operating systems the premise is true. Here comment on two of the fundamental requirements is appropriate for the approach to be successful.

The first requirement is a source of accurate timing interrupts. On the PC motherboard there are two potential sources and most PC operating systems including the IBM Microkernel, Mach, Windows, and OS/2 use either one or other; see *AN OS/2 High Resolution Software Timer*, D. Williams, IBM Personal Systems Developer, 1991; *The Design of OS/2*, H. M., Deitel and M. S. Kogan, Addison-Wesley, Reading, Mass., 1991; *The IBM Personal System/2 and Personal Computer BIOS Interface Technical Reference*, IBM, 2nd Edition, 1988; and *Undocumented Windows—A Programmer's Guide to Reserved Microsoft Windows API Functions*, Schulman, A., Maxey, D., Pietrek, M., Addison-Wesley, Reading, Mass. 1992. Thus, at least for the PC, there is likely to always be a good source of timer interrupts. Should a source of interrupts not be available then one can always add a separate timing board. This is, in fact, standard practice for configuring machines to run the Real-Time Mach operating system on a PC. Thus, it is reasonable to assume all systems will have a reliable source of timer interrupts.

The second is the requirement that inter-operating system critical sections can be discovered and locked without access to source code. There is confidence that this will be the case for peripheral devices as device driver interfaces are typically well-documented. Thus, in the worst case, one can simply develop a new device driver for devices that are to be used by the real-time kernel. Device drivers are typically written from scratch for most devices that are to be attached to a real-time system. Thus, in the worst case, the framework does not incur more work than is typically required of others.

The ability to deal with critical sections affecting the CPU will largely be a function of the design and structure of the general purpose operating system: The most difficult critical section for the i486 architecture involves the TSS. However, since ring systems such as the IBM Microkemel, OS/2, and Windows do not use the hardware task switch feature, much of the complexity of managing the TSS is mitigated.

Summary and Conclusions

Distributed multimedia applications are typical of new and emerging applications that require real-time communication and computation services to realize their full potential. Commercial desktop operating systems, while providing limited or no real-time support, remain the primary platform of choice for these applications. By this invention a method has been illustrated for allowing real-time kernels to co-exist with general purpose operating systems on a single computer. This provides a means of presenting users and applications with the best of both worlds at a modest cost The basic approach is to develop executives for each shared device that allocate the consumable resources of the device to the co-resident operating systems, and partition the serially reusable resources between the two systems. The feasibility of the approach can be demonstrated by constructing a set of executives to allow the IBM Microkernel and OSF/1 to co-exist with a simple real-time kernel. These executives should also work with the Mach kernel.

The initial prototypes of the executives impose an overhead of 12% on the general purpose and real-time operating systems. More importantly, the real-time kernel is as predictable as a kernel executing on a bare machine. In addition, for the resource allocation model used by the CPU executive there have been developed necessary and sufficient conditions for determining when a set of periodic tasks will be feasible when executed on a co-resident real-time kernel that only receives a fraction of the overall processing time.

The system described herein has three main parameters whose absolute and relative setting are variables. The parameters are: (a) the duration of a time slot 53—the lowest level unit of CPU allocation, (b) the duration of a real-time minor cycle 51, and (c) the duration of a non-real-time minor cycle 50. The performance implications of such parameter choices are the subject of investigation in design of a system using the invention. The description above is focused on the use of the IBM Microkernel as the operating system 20, but it is understood that the executives can be applied to other operating systems, such as OS/2 and Windows.

While the invention has been particularly shown and described with reference to a preferred embodiment, it will be understood by those skilled in the art that various changes in form and detail may be made therein without departing from the spirit and scope of the invention.

What is claimed:

1. A method of providing real-time computing support within a data processing system, wherein said data processing system includes a processor, a first operating system, a second operating system a real-time clock, and a plurality of tasks, wherein said first operating system is a general purpose operating system which operates on a non-real-time basis, and said second operating system operates on a real-time basis, said method comprising the steps of:

periodically determining real-time computing support requirements of each of said plurality of tasks within said data processing system utilizing a resource allocation model; and dynamically scheduling and allocating system resources within said data processing system to each of said first operating system and said second operating system on a regular and precise basis as determined by said real-time clock, in response to said determination step, such that said first operating system has control of said processor for a predetermined and selected portion of a cycle of operation and said second operating system has control of said processor for a remainder portion of said cycle of operation.

2. A method according to claim 1 wherein said first operating system has at least a first task executing thereunder, and said second operating system has at least a second task executing thereunder.

3. A method according to claim 2 wherein said first task and said second task share a memory space.

4. A method according to claim 3 including the step of checking a memory reference to said memory space while executing said second task to make sure that said memory reference does not conflict with use of said shared memory space by said first task.

5. A method according to claim 1, said method further comprising the steps of:

generating a repetitive time marker having a first period; and performing said determination step and said allocation step in response to said repetitive time marker.

6. A data processing system having a processor, a first operating system, a second operating system, a real time clock, and a plurality of tasks, wherein said first operating system is a general purpose operating system, which operates on a non-real-time basis, and said second operating system operates on a real-time basis, said data processing system comprising:

means for periodically determining real-time computing support requirements for each of said plurality of tasks within said data processing system utilizing a resource allocation model; and means for dynamically scheduling and allocating system resources within said data processing system to each of said first operating system and said second operating system on a regular and precise basis as determined by said real-time clock, in response to said determination step, such that said first operating system has control of said processor for a predetermined and selected portion of a cycle of operating and said second operating system has control of said processor for a remainder portion of said cycle of operation.

7. A system according to claim 6 wherein said first operating system has at least a first task executing thereunder, and said second operating system has at least a second task executing thereunder.

8. A system according to claim 7 wherein said first task and said second task share a memory space of said memory.

9. A system according to claim 8 including means for checking a memory reference to said memory space while executing said second task to make sure that said memory reference does not conflict with use of said shared memory space by said first task.

10. A system according to claim 6, said system further comprising:

means for generating a repetitive time marker having a first period; and means for performing said determination means and said allocation means in response to said repetitive time marker.

* * * * *